July 10, 1934.　　　H. A. BOEHMER ET AL　　　1,965,920
COMBINATION LOCK FOR MOTOR VEHICLES
Filed June 1, 1933　　　4 Sheets-Sheet 1
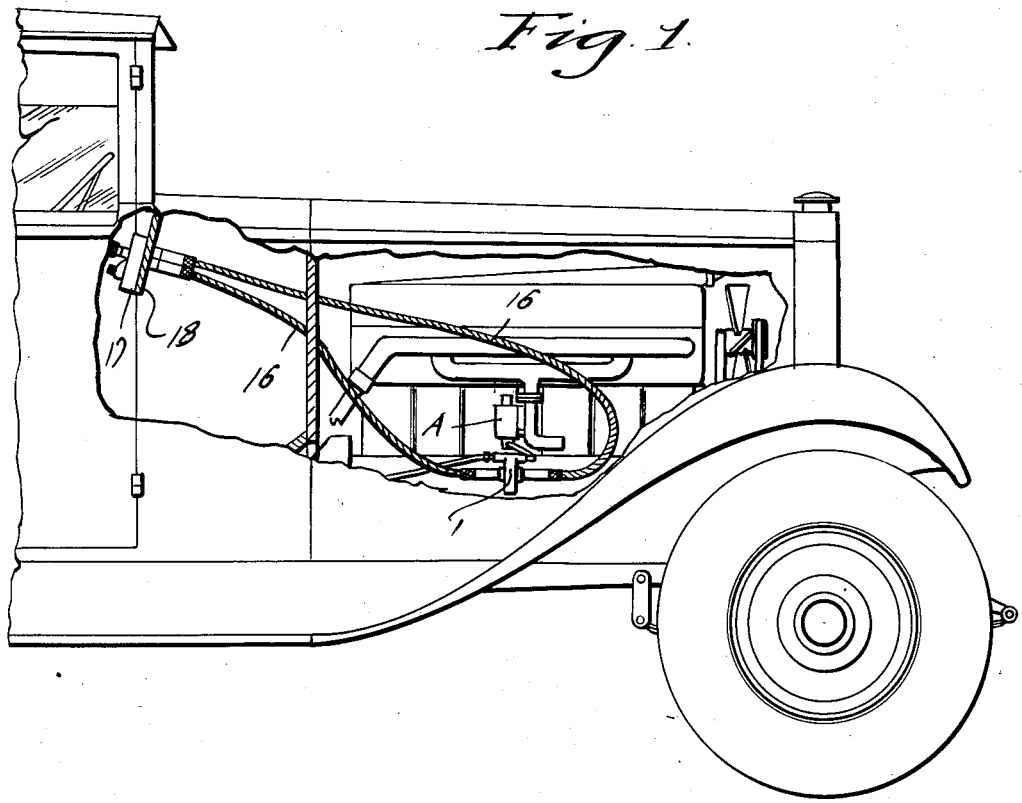
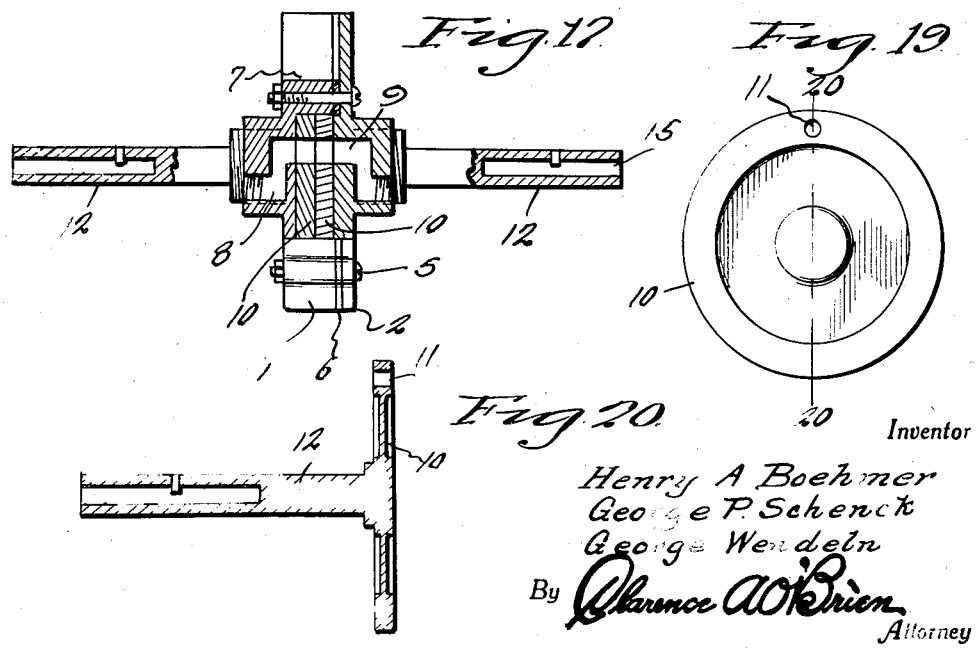
Inventor
Henry A Boehmer
George P. Schenck
George Wendeln
By Clarence A O'Brien
Attorney July 10, 1934.   H. A. BOEHMER ET AL   1,965,920
COMBINATION LOCK FOR MOTOR VEHICLES
Filed June 1, 1933   4 Sheets-Sheet 2
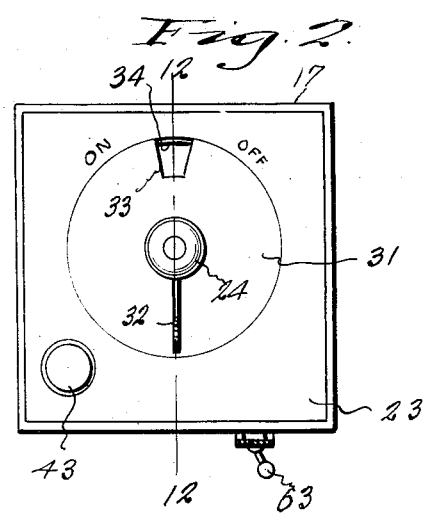
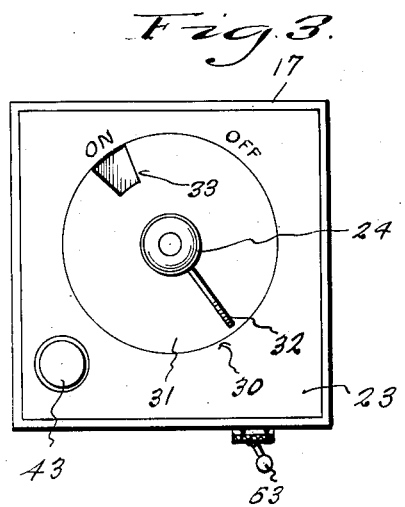
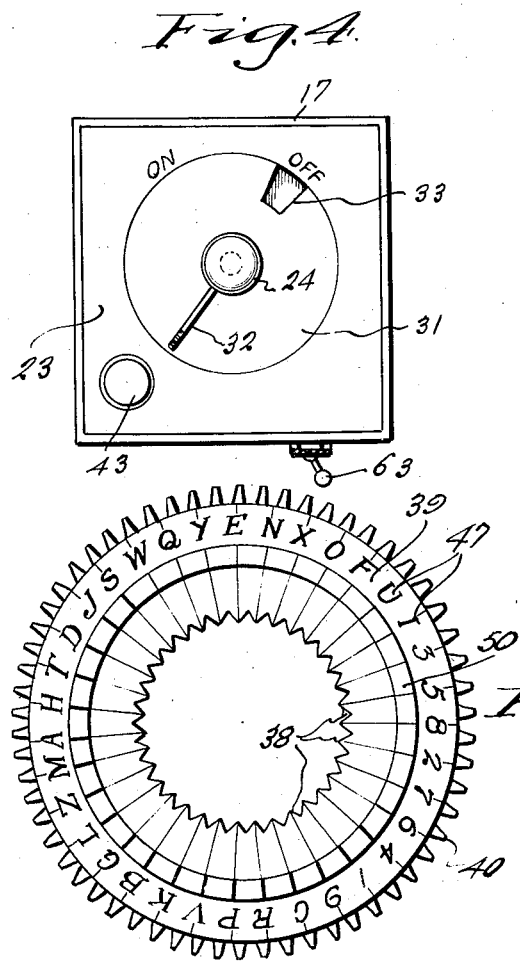
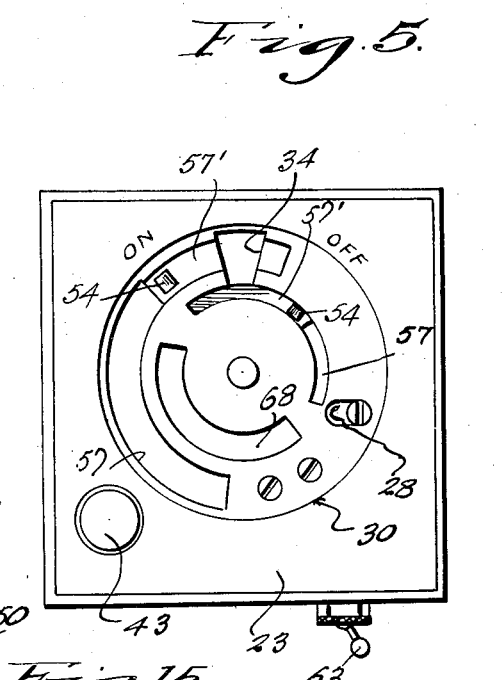
Inventor
Henry A. Boehmer
George P. Schenck
George Wendeln
By Clarence A. O'Brien
Attorney July 10, 1934.  H. A. BOEHMER ET AL  1,965,920
COMBINATION LOCK FOR MOTOR VEHICLES
Filed June 1, 1933   4 Sheets-Sheet 3
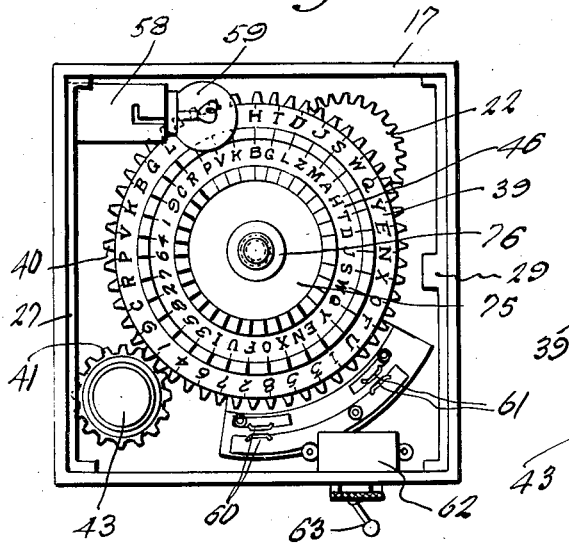
Fig. 6.
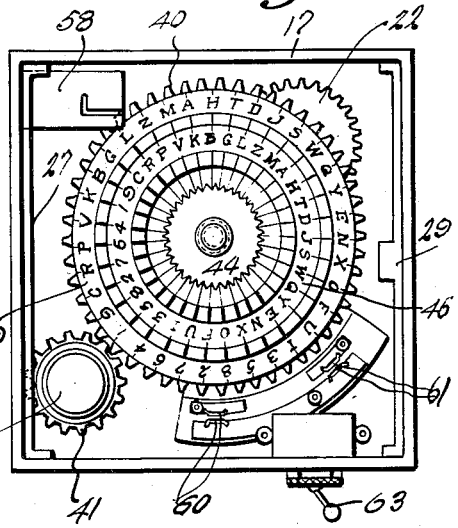
Fig. 7.
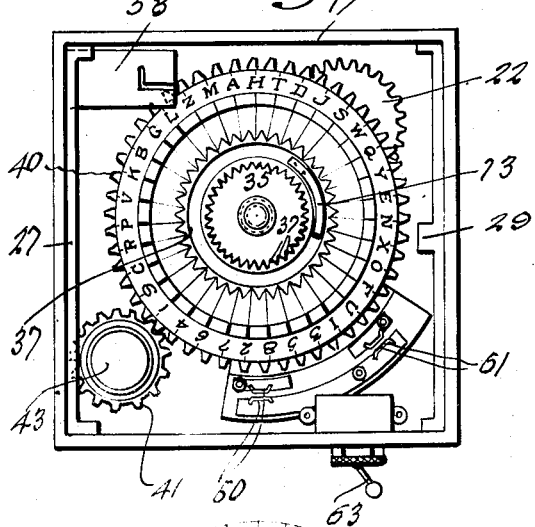
Fig. 8.
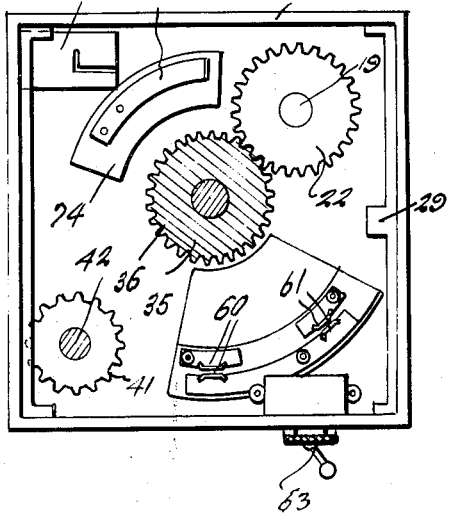
Fig. 9.
Fig. 16.
Inventor
Henry A. Boehmer
George P. Schenck
George Wendeln
By Clarence A. O'Brien
Attorney

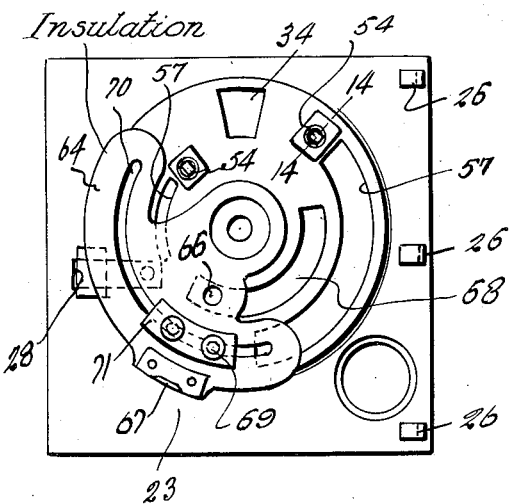
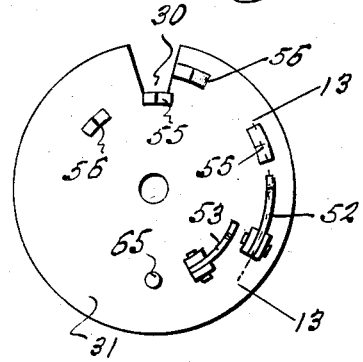
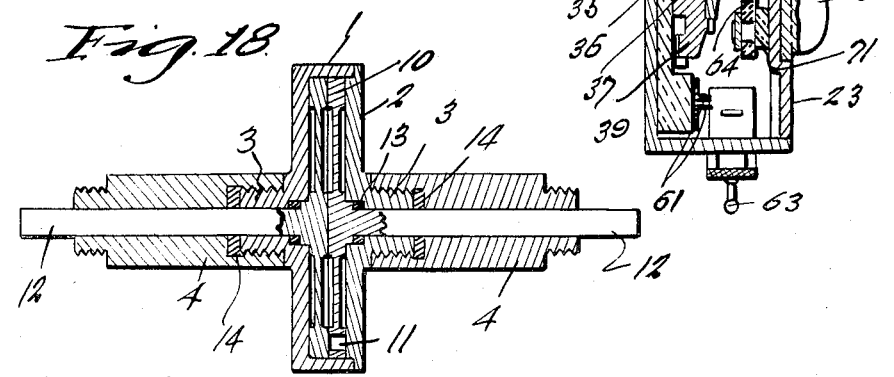
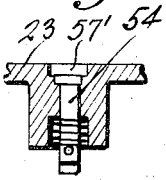

Patented July 10, 1934

1,965,920

UNITED STATES PATENT OFFICE 1,965,920

COMBINATION LOCK FOR MOTOR VEHICLES

Henry A. Boehmer, George P. Schenck, and George Wendeln, St. Louis, Mo.

Application June 1, 1933, Serial No. 673,904

8 Claims. (Cl. 70—53)

This invention relates to a combination lock for motor vehicles, the general object of the invention being to provide means for closing the gasoline line to the carbureter when the locking device is in locked position so that it will be impossible for an unauthorized person to drive off with the vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary side view of a motor vehicle, showing the invention in use thereon, portions of the vehicle being broken away.

Figure 2 is a view of the lock, with the parts in a position for setting the dials.

Figure 3 is a similar view, with the parts in "on" position.

Figure 4 is a similar view, with the parts in "off" position.

Figure 5 is a similar view, but with the handle carrying plate removed.

Figure 6 is a view with the cover plate removed.

Figure 7 is a similar view, with the washer removed to show how the top or small dial is removably connected with its shaft.

Figure 8 is a similar view, with the upper or small dial removed.

Figure 9 is a similar view, with both dials removed to show the parts underneath said dials, this view showing portions in section.

Figure 10 is a view looking toward the inner face of the cover plate.

Figure 11 is a view looking toward the inner face of the handle carrying plate.

Figure 12 is a section on line 12—12 of Figure 2.

Figure 13 is a section on line 13—13 of Figure 11.

Figure 14 is a section on line 14—14 of Figure 10.

Figure 15 is a view of the large dial.

Figure 16 is a view of the small dial.

Figure 17 is a side view, with parts in section, of the valve means.

Figure 18 is a longitudinal sectional view through such means.

Figure 19 is a face view of one of the valve disks.

Figure 20 is a section on line 20—20 of Figure 19.

In these drawings, the numeral 1 indicates a valve casing and the numeral 2 a cover plate therefor, said casing and plate being provided with the threaded nipples 3 for receiving the couplings 4. The plate 2 is bolted to the casing, as shown at 5, and a gasket 6 is located between the parts to form a fluid-tight joint and said casing and cover plate are each formed with an offset part 7. Each offset part is formed with a substantially L-shaped passage 8 and the inner ends of these passages communicate with ports 9, one of which is formed in the cover plate and the other in the casing, the two ports being in alignment with each other, as shown in Figure 17. One of these parts is connected to a portion of the gasoline line close to the carbureter A, as shown in Figure 1, and the other part is connected with the major portion of the line, as also shown in Figure 1. By making the passages 9 of the shape shown, it will be practically impossible for one to disconnect a part of the line and pass a wire or the like through the passage in an attempt to set the valve disks which are located in the casing.

Each disk is formed with a port 11 and when the two disks are placed in a certain position, these ports will align with each other and with the ports 9, so that gasoline can flow through the line to the carbureter. When the ports in the disks are out of alignment with the ports 9, of course, the flow of gasoline is prevented, for even if one port is out of alignment with the passages, the flow of gasoline will be prevented.

Each disk is provided with a stem 12 which passes through a nipple 3 and through a coupling 4 and suitable packing means are provided for the parts, as shown at 13 and 14 in Figure 18. The stems are preferably formed with the sockets 15 for receiving the ends of wires or flexible members which pass through flexible casings 16, each of which has one end connected to a coupling 4.

A lock casing 17 is suitably arranged in the body of the automobile, preferably on the instrument board 18, as shown in Figure 1. This casing carries the shafts 19 and 20 which receive the other ends of the flexible members and the casing also has attached thereto the couplings 21 through which the shafts pass and to which the other ends of the flexible casings 16 are connected, as also shown in Figure 1. The shaft 19 terminates within the casing 17 where a gear 22 is attached thereto. The other shaft 20 passes entirely through the casing and through the cover plate 23 of the casing and has a knob 24 threaded thereto and also held thereto by a set screw 25, as shown in Figure 12.

The cover plate carries the lugs 26 on its under face, adjacent one edge thereof, for engaging an internal rib or lip 27 on the casing 17 and the cover plate also carries a sliding lock or bolt 28 for engaging under a lug 29 in the casing, so that when said bolt 28 is projected and the lugs 26 are placed under the lip 27, the cover plate is locked in closing position on the casing. The front of the cover plate is formed with a depression 30 of circular formation in which fits a circular plate 31 having a handle 32 formed thereon. This plate is rotatably arranged on the outer end of the shaft 20 and is held in place by the knob. The plate is also formed with a small window 33 which is arranged opposite the handle 32. A similarly shaped window 34 is formed in the cover plate 23 and when the circular plate 31 is in an intermediate position, the two windows will align with each other, as shown in Figure 2. When the plate 31 is in one extremity of its movement, the window 33 will be adjacent the word "off" on the cover plate, as shown in Figure 4, and in this position, the parts have been moved to close the gasoline line by the valve members 10. In the other limit of its movement, the window 33 of the plate 31 will be opposite the word "on" on the cover plate, as shown in Figure 3, and in this position of the plate 31, the parts will be in a position with the gasoline line open, as the valve members 10 are in the position shown in Figure 17.

A double gear 35 is located in the casing 17 and is rotatably arranged on the shaft 20 and has the teeth 36 thereon which mesh with the gear 22, as shown in Figures 9 and 12, and said gear 35 is also formed with the teeth 37 for engaging the teeth 38 on the inner periphery of the large dial 39 shown in detail in Figure 15, and this dial 39 is formed with the exterior teeth 40 which mesh with the gear 41 on a shaft 42 which passes through the cover plate and is provided with a knob 43 on its outer end. Thus by turning the knob 43, the shaft 42 and the gear 41 are turned and the turning of the gear 41 will turn the large dial 39 and through its inner teeth 38 engaging the teeth 37 of the double gear 35, said double gear will be turned on the shaft 20 and the meshing of the teeth 36 with the gear 22 will turn the shaft 19, which results in the turning of one of the disks 10 of the valve.

A gear 44 is formed on the shaft 20 and is located in the casing 17 and its teeth are adapted to engage the internal teeth 45 of the small dial 46 so that by turning the knob 24, the shaft 20 is turned, which results in the turning of the other valve disk 10 and also the turning of the small dial 46.

The dial 39 carries the combination characters 47, while the small dial 46, as shown in Figure 16, carries the combination characters 48, and as will be seen from Figures 6 and 7, by making one dial large and the other small, both sets of reference characters can be seen, but it will, of course, be understood that when the cover plate and the plate 31 are in position, the characters on the dials cannot be seen until the plate 31 has been moved to the position it occupies in Figure 2. It will also be understood that a certain character on the large dial 39 and a certain character on the small dial 46 will appear at the window 33 when the parts have been adjusted to open the valve means to permit the gasoline to pass into the carbureter. By having the internal teeth of the two dials engage the teeth of the parts with which they are associated, the dials can be readily removed and repositioned on said parts so as to change the combination characters which will appear at the window when the parts are properly positioned to open the valve means and this arrangement provides a great number of different combinations for the device.

The large dial is formed with the ratchet teeth 50 on its outer or top face and the small dial is provided with the ratchet teeth 51 on its outer face and a pair of spring pressed dogs 52 and 53 is pivoted to the under face of the plate 31 for engaging these ratchet teeth 50 and 51. These parts are so formed and arranged that when the plate 31 is moved from its "off" position to its "on" position, the dogs will ratchet over the teeth so that the dials will not be moved, but when the plate 31 is moved in an opposite direction from the "on" position to the "off" position, the dogs will lock with the teeth and thus the dials will be moved with the plate and thus the proper combination characters will be moved from under the window and it will be necessary to again turn the knobs to bring the proper combination characters under the window before the valve means can be opened. The dogs prevent retrograde movement of the dials, so that the dials must always be turned in one direction.

The cover plate 23 carries a pair of spring plungers 54 which are held in locking engagement with the ratchet teeth 50 and 51 by the two pairs of lugs 55 and 56 on the under side of the plate 31, as shown in Figure 11, when said plate 31 is either in its "on" position or its "off" position. However, when the plate is in the position shown in Figure 2, with its window in alignment with the window of the cover plate, the lugs will be out of engagement with the plungers so that the dials can turn in a clockwise direction, but not in an opposite direction, as the plungers will ratchet over the dial teeth when the dial is turned in a clockwise direction but will engage the teeth when the dial is turned in an opposite direction. There must be sufficient play in the dogs 52 and 53 and the teeth 50 and 51 to permit a sufficient amount of movement of the plate 31 to cause the lugs 55 and 56 to free the plungers to enable the dogs to move the dials.

The cover plate is provided with the arcuate slots 57 for the passage of the dogs 52 and 53 and also has the arcuate grooves 57' in its upper face for the passage of the lugs 55 and 56, the upper ends of the plungers 54 being located in said grooves.

A socket 58 is located in the casing 17 for a small lamp 59 which illuminates the dials so that they can be seen through the window and a pair of spaced contacts 60 is located in the casing and suitably insulated and these contacts are electrically connected with the socket. A second pair of spaced contacts 61 is located in the casing and these contacts are located in the ignition circuit of the motor of the vehicle or they may be placed in the circuit of the starter motor. A switch 62 is located in the ignition circuit and has an external handle 63 so that by opening this switch 62, the motor can be stopped without operating the invention to close the gasoline line. This is desirable when one wishes to stop his motor, but does not wish to lock it.

A non-conducting member 64 has a portion surrounding a part of the shaft 20 and said member is caused to move with the plate 31 by means of a pin 65 on the plate engaging a hole 66 in the member 64. The member 64 carries a contact 67 for bridging the contacts 60 and 61 and these parts are so arranged that when the plate 31 is in the position shown in Figure 2, the contact 67 will bridge the contacts 60 and thus the circuit of the lamp 59 will be closed so that the dials will be illuminated. Then when the plate 31 is moved to its "on" position, the contact 67 will bridge the contacts 61 so that the motor circuit will be completed. When the plate 31 is in its "off" position, contact 67 will be out of engagement with both circuits of contacts 60 and 61 and thus the lamp 59 will not be lighted and the ignition or motor circuit will be broken. The cover plate has a slit 68 therein for the passage of the pin 65 and pins 69 pass through an arcuate slot 70 in the member 64 and are attached to a block 71 supported from the cover plate, these parts acting as guiding means for the member 64.

Small radiating notches 72 are formed in the under face of each of the dials and are engaged by the spring dogs 73, the dog for the large dial being attached to a block 74 on the bottom of the casing and the dog for the small dial being carried by the double gear 35, as shown in Figure 8. The dogs engaging the notches will produce a clicking noise and said dogs act as resilient stops for facilitating the correct amount of movement of the dials when they are turned to bring the reference characters opposite the windows.

A washer 75 and a nut 76 are placed on the shaft 20 within the casing and act to hold the parts assembled, as shown in Figure 12.

With the parts in inoperative position, and the operator wishes to start the motor of the vehicle, he would first turn the plate 31 by its handle 32 to the position shown in Figure 2, and as this is done, the contact 67 will bridge the contacts 60, so that the lamp 59 will be lighted to illuminate the dials so that the operator can see the characters on said dials through the windows 33 and 34. He would then turn the knob 43 so that the gear 41 will turn the large dial 39 which in turn moves the member 35 and this member 35 turns the shaft 19 through means of the gear 22. Thus one of the valve disks 10 will be turned. Of course, this knob is turned until the proper character on the large dial comes under the window. He then turns the knob 24 which turns the shaft 20 and the small dial and when the proper character on this small dial comes under the window, the second valve disk 10 will be in proper position to open the fuel line to the carburetor. However, the ignition circuit is still open and thus the motor cannot be started. The operator then turns the plate 31 from the position shown in Figure 2 to that shown in Figure 3, which closes the window, opens the circuit to the lamp 59 and causes the contact 67 to bridge the contacts 61 and thus the ignition or motor circuit is closed so that the motor can be started. As before stated, the dials are locked against movement when the plate is in its "on" position and, therefore, a child or other person cannot move the knob which would close the gasoline line and thus stop the motor. If the operator wishes to stop his motor without changing the invention to a position to close the gasoline line, all he needs to do is to open the switch 62 by the handle 63 when the circuit to the motor will be broken and then when he wishes to start again, he simply closes the switch 62. If the operator wishes to leave the car and desires to lock it against unauthorized use, he would move the plate 31 by its handle 32 to the "off" position shown in Figure 4. When this is done, the dogs 52 and 53, engaging the ratchets 50 and 51, will move the dials and, therefore, the shafts 19 and 20 so that the valve disks will be moved to a position to close the gasoline line, the ignition or motor circuit will be opened and the proper combination characters on the dials will be moved from under the window and the window will be closed.

The combination can be changed very readily by simply lifting the dials from their toothed carrying members and putting them back in place in a different position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A lock device for a motor vehicle comprising a lock casing, shafts extending thereinto, manually operated means for moving each shaft, combination dials in the casing for indicating when the shafts have been moved to one position, a rotary plate on the casing having a window therein, which, when the plate is in a certain position, will expose portions of the dials and means operated by the turning of the plate in a certain direction from the last mentioned position to move the dials and the shafts to a second position.

2. A lock device for a motor vehicle comprising a lock casing, shafts extending thereinto, manually operated means for moving each shaft, combination dials in the casing for indicating when the shafts have been moved to one position, a rotary plate on the casing having a window therein, which, when the plate is in a certain position, will expose portions of the dials, means operated by the turning of the plate in a certain direction from the last mentioned position to move the dials and the shafts to a second position, a lamp in the casing for illuminating the dials, a circuit for the lamp, a switch in the circuit, means for closing said switch when the rotary plate is moved to the position where the window will be open and means for opening said switch by movement of the rotary plate to a third position, such plate moving from its first or intermediate position to the last mentioned position without operating the dials.

3. A lock device for a motor vehicle comprising a lock casing, shafts extending thereinto, manually operated means for moving each shaft, combination dials in the casing for indicating when the shafts have been moved to one position, a rotary plate on the casing having a window therein, which, when the plate is in a certain position, will expose portions of the dials, means operated by the turning of the plate in a certain direction from the last mentioned position to move the dials and the shafts to a second position, said plate being movable to a third position to close the window, such plate moving from its first or intermediate position to the last mentioned position without operating the dials and means for locking the dials against movement when the plate is in either its first mentioned position or last mentioned position, such means being in released position when the plate is in a position with its window exposing parts of the dials.

4. A lock device for a motor vehicle comprising a lock casing, a pair of shafts extending into the same, manually operated means for turning the shafts, combination dials associated with the shaft turning means for indicating when the parts are in one position, a cover plate for the casing having a window therein, a rotary plate on the casing having a window therein, said plate, when moved from a first position to an intermediate position, having its window in alignment with the first mentioned window to expose portions of the dials, and means operated by the movement of the rotary plate to another position from its intermediate position for turning the dials and operating the shafts to another position.

5. A lock device for a motor vehicle comprising a lock casing, a pair of shafts extending into the same, manually operated means for turning the shafts, combination dials associated with the shaft turning means for indicating when the parts are in one position, a cover plate for the casing having a window therein, a rotary plate on the casing having a window therein, said plate, when moved from a first position to an intermediate position, having its window in alignment with the first mentioned window to expose portions of the dials, means operated by the movement of the rotary plate to another position from its intermediate position for turning the dials and operating the shafts to another position, a lamp for illuminating the dials and means for closing the circuit of said lamp when the rotary plate is moved to a position where its window is in alignment with the window of the cover plate.

6. A lock for a motor vehicle comprising a lock casing, a pair of shafts extending thereinto, one shaft extending through the casing, a knob on the extended end of said shaft, a third shaft passing through the casing, a knob thereon, gearing connecting the third shaft with the second shaft of the pair of shafts, a large combination dial adjustably connected with one of said gears, a small combination dial adjustably connected with that shaft of the pair which extends through the casing, said casing having a window therein for exposing parts of the dials, a rotary plate on the casing having a window therein which will align with the window of the casing when the plate is in an intermediate position, ratchet means between the plate and the dials for moving the dials and shafts to one position when the plate is moved to an "off" position, plungers in the casing and means for depressing the plungers into locking engagement with parts of the dials when the plate is in either "on" or "off" position, but releasing the plungers when the plate is in intermediate position with its window in alignment with the window of the casing.

7. A lock for a motor vehicle comprising, a lock casing, a pair of shafts extending thereinto, one shaft extending through the casing, a knob on the extended end of said shaft, a third shaft passing through the casing, a knob thereon, gearing connecting the third shaft with the second shaft of the pair of shafts, a large combination dial adjustably connected with one of said gears, a small combination dial adjustably connected with that shaft of the pair which extends through the casing, said casing having a window therein for exposing parts of the dials, a rotary plate on the casing having a window therein which will align with the window of the casing when the plate is in an intermediate position, ratchet means between the plate and the dials for moving the dials and shafts to one position when the plate is moved to an "off" position, plungers in the casing, means for depressing the plungers into locking engagement with parts of the dials when the plate is in either "on" or "off" position, but releasing the plungers when the plate is in intermediate position with its window in alignment with the window of the casing and means for providing a clicking noise when each dial is moved a distance equal to the space between each pair of characters thereon.

8. A lock device comprising a casing, a pair of shafts rotatably supported thereby, with one shaft extending entirely through the casing, a double gear in the casing rotatably arranged on the extended shaft, a gear on the other shaft meshing with one part of the double gear, a knob carrying shaft extending through a part of the casing and having a gear thereon, a combination dial having internal teeth engaging another set of teeth of the double gear and said dial having internal teeth meshing with the gear of the knob carrying shaft, the extended shaft having a gear thereon, a second combination dial having internal teeth meshing with the last mentioned teeth, each of said dials being removable whereby they can be removed from the teeth with which they mesh and placed back in another position to change the combination, said casing having a window therein to expose portions of the dials.

HENRY A. BOEHMER.
GEORGE P. SCHENCK.
GEORGE WENDELN.